US006991481B1

(12) United States Patent
Guan et al.

(10) Patent No.: US 6,991,481 B1
(45) Date of Patent: Jan. 31, 2006

(54) METHOD AND APPARATUS FOR A LATCHABLE AND PLUGGABLE ELECTRONIC AND OPTICAL MODULE

(75) Inventors: William Z. Guan, Union City, CA (US); Olivier Villiod, Longpont sur Orge (FR)

(73) Assignee: Avonex Corporation, Fremont, CA (US)

( * ) Notice: Subject to any disclaimer, the term of this patent is extended or adjusted under 35 U.S.C. 154(b) by 0 days.

(21) Appl. No.: 10/892,903

(22) Filed: Jul. 16, 2004

(51) Int. Cl.
*H01R 13/62* (2006.01)

(52) U.S. Cl. ..................................... 439/160; 439/372
(58) Field of Classification Search ................ 439/152, 439/160, 352, 372, 906, 731, 687, 696, 76.1
See application file for complete search history.

(56) References Cited

U.S. PATENT DOCUMENTS 6,705,764 B2 * 3/2004 Shang ......................... 385/53
6,749,448 B2 * 6/2004 Bright et al. ................ 439/160
6,824,416 B2 * 11/2004 Di Mascio ................... 439/352
2004/0077207 A1 * 4/2004 Ice ............................... 439/357
2004/0101257 A1 * 5/2004 Kruger et al. ................ 385/92

* cited by examiner

Primary Examiner—Tho D. Ta
(74) Attorney, Agent, or Firm—Patterson & Sheridan LLP

(57) ABSTRACT

A latchable and pluggable module includes a top portion and a bottom portion coupled to the top portion, both the top portion and the bottom portion having side walls, the side walls of the top portion having narrowed portions at their front ends and the side walls of the bottom portions having recessed regions at their front ends such at a gap exists at the front end of each side of the module. The module further comprises a bail that rotates about or around two first pins inserted through the sides of the bail and the side walls of the bottom portion and two slider strips positioned and constrained to move between each recessed region and each corresponding narrowed portion, the slider strips coupled to the bail by two second pins passing through each bail side and a corresponding slider strip, each slider strip having an outwardly flared tab portion that may engage with an inwardly bent tab portion of a housing, cage or container.

15 Claims, 5 Drawing Sheets

US 6,991,481 B1

METHOD AND APPARATUS FOR A LATCHABLE AND PLUGGABLE ELECTRONIC AND OPTICAL MODULE

FIELD OF THE INVENTION

The present invention relates generally to the field of electrical connector systems for electrical components. In particular, the present invention relates to a latching system that for use with low profile, user-removable, electronic modules that interface with a port of a host device and with an optical communications network.

BACKGROUND OF THE INVENTION

Fiber optics are increasingly used for transmitting voice and data signals. Generally, however, the data carried by light signal must be converted to an electrical format when received by a device, such as a network switch. Conversely, when data is transmitted to the optical network, it must be converted from an electronic signal to a light signal. Typically, an optical transmitter, receiver or transceiver module is electrically interfaced with a host device such as a host computer, switching hub, network router, switch box, and the like via a compatible connection port. Certain international and industry standards have been adopted that define the physical size and shape of optical transceiver modules to insure compatibility between different manufacturers. For example, in 1998, a group of optical manufacturers developed a set of standards for optical transceiver modules called the Small Form-factor Pluggable ("SFP") Transceiver MultiSource Agreement ("MSA"). In addition to the details of the electrical interface, this standard defines the physical size and shape for the SFP transceiver modules, and the corresponding host port, so as to insure interoperability between different manufacturers' products. The standard also specifies that the module be hot-pluggable, that is, that it may be removed or inserted while in operation. Although the industry standard specifies a minimum amount of space between host ports, so that transceiver modules can be individually accessed and removed from the host device without disturbing the adjacent modules and/or cable connections, there is often a desire to provide configurations having a higher port density.

To provide for higher port density while maintaining other aspects of the SFP design of the MSA standard, an integrated latching mechanism has been proposed in U.S. Pat. No. 6,533,603 in the name of Togami. In the module apparatus taught by Togami, the latch mechanism is operated by way of a moveable bail lever that is moveable between two positions, which in turn dictate the position of a locking pin. When placed in a latched position, the locking pin extends from the module and engages with a corresponding recess within a host port, causing the module to be latched and secured within the port. When the bail is moved to an unlatched position, the locking pin is disengaged from the locking recess, which permits the module to be extracted from the port. In the apparatus taught by Togami, movement of the locking pin by way of the bail is accomplished with a cam portion that is integrated with the bail lever. Rotation of the bail causes manipulation of the cam, which in turn operates against a cam follower surface formed on a pivot block which carries the locking pin and that has pivot arms that are held within pivot points on the top surface of a connector portion. When in the latched position, the cam is disengaged from the cam follower surface, and a biasing means formed on the housing urges the pivot block to rotate the locking pin into the latched position. In the unlatched position, the cam forces the pivot block to rotate the locking pin so that it is disengaged from the locking recess.

Although the latch mechanism of the aforementioned Togami apparatus appears to perform its intended function adequately, it, disadvantageously, requires a pivot block and an associated pivot-point means of attachment of the pivot block to the connector portion of the module. The need for a pivot block and its associated means of attachment adds complexity and cost to the latching mechanism and occupies volume within the module. Unfortunately, the total volume available within a module may be severely constrained and, in such a situation, the need for the pivot block for latching purposes causes the space available for other critical components to be reduced.

Because of these aforementioned disadvantages of the latching mechanism of the prior art, there is currently a need for a latchable optical and electronic module, such as an optical transceiver module, having a simple latching mechanism that does not require a pivot block but that, nonetheless, permits maximum port density, maintains compliance with the mechanical dimensions of existing industry standard modules, permits the module to be easily inserted and extracted from a port without disturbing the communications link of adjacent modules and that provides a means for simple extraction or insertion of the module. The present invention addresses such a need.

SUMMARY OF THE INVENTION

To address the above-discussed needs, the present invention discloses an improved latchable and pluggable optical and electronic module, such as a transceiver module conforming to the MSA standard, having a bail coupled to a pair of slider strips having, at their ends, outwardly flared tab portions that, depending upon the position of the bail, either engage or do not engage an inwardly bent tab portion of a container or cage housing the module.

In a preferred embodiment, the module is formed as a small form-factor pluggable ("SFP") device in accordance with existing industry standards. Moreover, the module is capable of being operatively received within a housing or cage provided by the host device. A preferred embodiment of a latchable and pluggable module in accordance with the present invention includes a top portion and a bottom portion coupled to the top portion, both the top portion and the bottom portion having side walls, the side walls of the top portion having narrowed portions at their front ends and the side walls of the bottom portions having recessed regions at their front ends such at a gap exists at the front end of each side of the module. The preferred embodiment of a latchable and pluggable module in accordance with the present invention further comprises a bail that rotates about or around two first pins inserted through the sides of the bail and the side walls of the bottom portion and two slider strips positioned and constrained to move between each recessed region and each corresponding narrowed portion, the slider strips coupled to the bail by two second pins passing through each bail side and a corresponding slider strip, each slider strip having an outwardly flared tab portion that may engage with an inwardly bent tab portion of a housing or container.

BRIEF DESCRIPTION OF THE DRAWINGS

The object and features of the present invention can be more fully understood and better appreciated with reference to the attached drawings, wherein.

DETAILED DESCRIPTION OF THE PREFERRED EMBODIMENTS

The present invention relates to an improved latching mechanism for a pluggable optical and electronic module. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein. To more particularly appreciate the features and advantages of the latchable opto-electronic module of the present invention, the reader is referred to the appended FIGS. 1–5 in conjunction with the following discussion.

Figure 1:
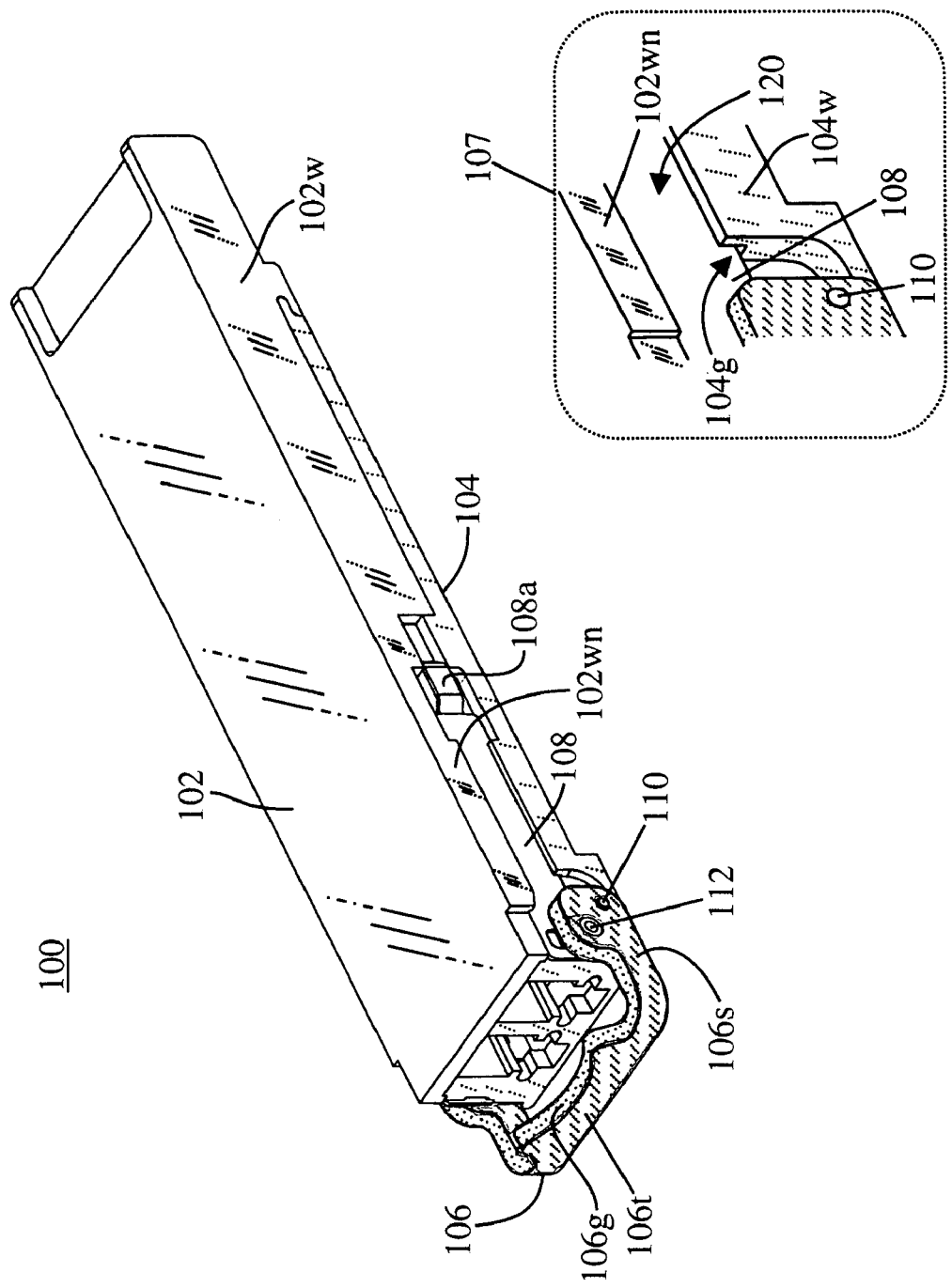
FIG. 1 is an external view of a preferred embodiment of a latchable opto-electronic module, shown in the un-latched position.
Figure 2:
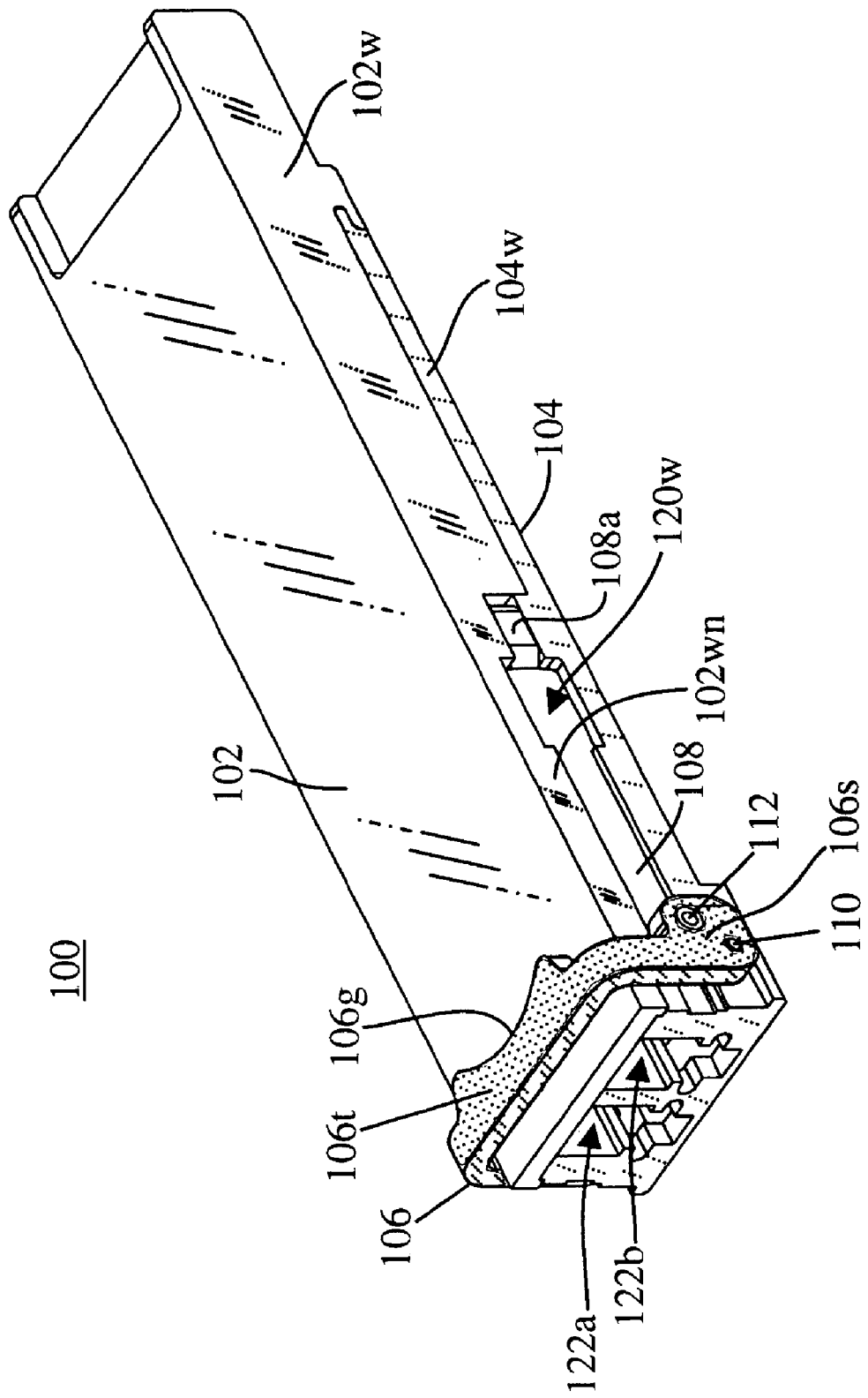
FIG. 2 is an external view of the latchable opto-electronic module of FIG. 1, shown in the latched position.

FIG. 1 is a drawing of a preferred embodiment of a latchable and pluggable opto-electronic module 100, shown in its un-latched position. FIG. 2 is a drawing of the same latchable opto-electronic module 100, shown in its latched position. Preferably, the overall dimensions of the latchable opto-electronic module 100 conform to industry standards, such as the MSA standard. The module 100 has two hollow front ports 122a–122b (FIG. 2), which, preferably, are also in conformance with industry standards, for insertion of optical fiber cables or connectors.

The latchable opto-electronic module comprises a top section 102 that mates with and couples to a bottom section 104, as shown in FIGS. 1–2. Although only one side is shown, generally, it is to be noted that, for each component referenced on the illustrated side of the apparatus, there is an identical component on the opposite, hidden side of the apparatus. The top section comprises two side walls 102w (only one of which is shown) that have narrowed or cutaway portions 102wn. Likewise, the bottom section comprises two side walls 104w. The narrowed-side-wall portions 102wn cause the existence of gaps 120 (one on each side; see inset box 107 in FIG. 1) between the top section and the bottom section and extending along the front portions of the sides of the module 100. Further, the narrowed-portion side walls 102wn and the side walls 104w are shaped such that the gaps 120 comprise enlarged-gap sections 120w (see FIG. 2).

The latching mechanism of the module 100 is partially comprised of a bail 106 being shaped such that it has two side sections 106s and a top section 106t. The top section 106t may comprise a concave finger guide 106g to aid a user to grab the bail. To latch the module 100 within a supporting cage or housing (described further in the following discussion), the user first lifts the bail 106 upward such that the bail top 106t is above and parallel to the top of the top section 102, as shown in FIG. 2, and then slides the module 100 into the cage or housing and pushes the module into its fully latched position. To release the module 100 from its cage or housing, the user first pulls the bail 106 forward and downward to the position shown in FIG. 1, wherein the bail top 106t is to the front of the module 100. The user then pulls or slides the module 100 out of its cage or housing in a forward direction.

When the user either pushes or pulls the bail 106, the movement of the bail is constrained to that of a rotation about two first pins 110 that extend through holes in the sides 106s of the bail 106 and into the bottom section 104. A second pin 112 also passes through each side 106s of the bail. Each one of the two second pins 112 extends through a respective side 106s of the bail 106 and into a respective slider strip 108, the two slider strips 108 constrained to movement inward of and parallel to the narrowed the side walls 102wn and the side wall 104w. During rotation of the bail 106 about the first pins 110, each second pin 112 either pulls or pushes the slider 108 to which it is coupled either forward or to the rear. The inset box 107 of FIG. 1 provides greater detail of a portion of a front side of the module 100. Within inset box 107, it may be seen the position and movement of the slider strip 108 is constrained, at its bottom edge, within a groove 104g that is formed in the side wall section. The movement of the slider strip is also constrained, at its upper edge, by the narrowed side wall 102wn of the top portion 102.

The details of the mechanism of latching the module 100 within a mounting unit are discussed in further detail in a following discussion herein. However, it may be noted, at this point, that the bail 106, as described herein, advantageously performs three functions. Firstly, the bail 106 acts as an actuator lever that a user may manipulate in order to place the module 100 into either a latched state or an un-latched state. Secondly, the bail 106 performs as a handle with which the user may pull the module 100 from a mounting unit, after the unit is placed into its un-latched state. Thirdly, the bail 106 acts as a safety guard that prevents a user from either unlatching the module when fiber-optic cables or connectors (not shown) are installed into the ports 122a–122b or from inserting such cables or connectors into the ports when the module 100 is not fully latched into its working position within a mounting unit. If a user were to attempt either such action, then the resulting signal surges within the electronic components of the opto-electronic module 100 could potentially cause damage to those components. The configuration of the bail of the present invention, as shown in FIGS. 1–2, prevents such situations.

Figure 3:
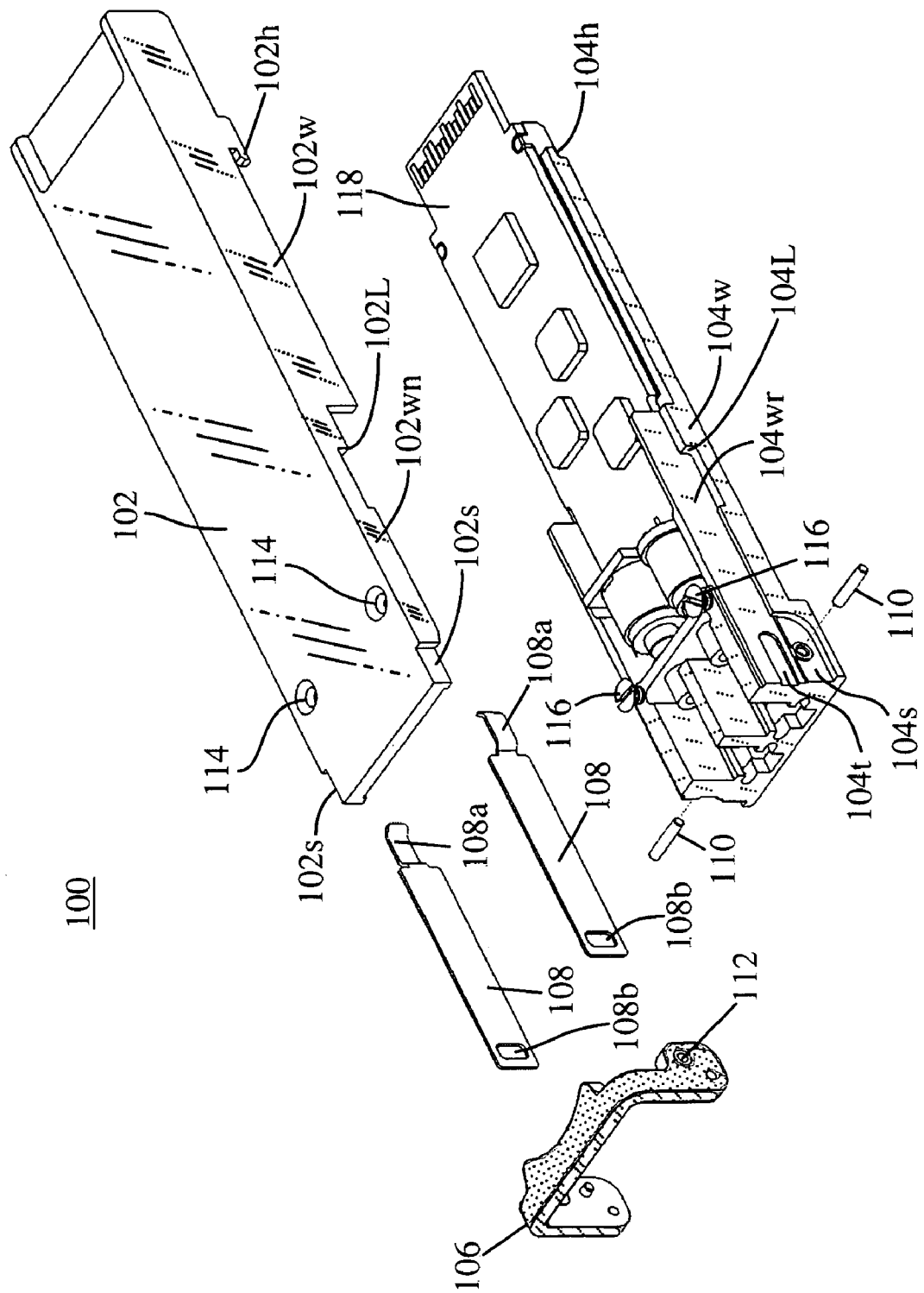
FIG. 3 is an exploded view of the latchable opto-electronic module of FIG. 1.

Discussion is now focused upon FIG. 3, which is an exploded view of the latcbable opto-electronic module 100 of FIGS. 1 and 2, showing, in greater detail, the latching mechanism and internal structure of the latchable opto-electronic module. An electronic circuit board 118 and or other optical, electronic and/or opto-electronic components may be housed within the interior of the module 100. Preferably, the module 100 is provided with fastening means for securing the top section 102 to the bottom section 104. In FIG. 3, the fastening means are shown, in one possible form, as screws 116 that are screwed into the bottom section 104 and that pass through clearance holes 114 within the top section 102. Further, a hook-locking mechanism may be used advantageously for fastening the rear portion of the top section 102 to the rear portion of the bottom section 104. The hook-locking fastening mechanism comprises two protruding hook sections 102*h* (one on each side) at the rear of the top section 102 and two mating thinned or cut-away sections 104*h* of the side walls of the bottom section 104. To secure the rear portion of the top section 102 to the rear portion of the bottom section 104, the user simply slides the top section, from a position slightly behind the bottom section, in a forward direction so that the protruding hook sections 102*h* engage with and mate to the thinned or cut away sections 104*h*. Then, to secure the front portion of the top and bottom sections to one another, the user may use the screws 116.

From FIG. 3, it may be seen that each slider strip comprises an outwardly-flared tab portion 108*a* at its back end and a clearance slot 108*b* at its front end, each second pin 112 passing through a respective clearance slot 108*b*. The slider strips 108 are constrained to slide within the groove 104*g* and against a recessed region 104*wr* of the side wall 104*w* of the bottom section 104. With the module 100 fully assembled, the recessed regions 104*wr* are partially covered or overlapped by the narrowed side walls 102*wn* of the top section 102 such that that each slider strip 108 is constrained to move, only along a direction parallel to the side walls, between a recessed region 104*wr* and a narrowed wall 102*wn* outward of the slider strip. Each recessed region 104*wr* is provided with a slot 104*t* at its forward portion, the slot providing clearance for the end of the second pin 112 inward of the slot 108*b* in the slider strip. Further, from FIG. 3, it may be seen that each enlarged-gap region 120*w* (noted in FIG. 2), is partially bounded, at its rearward end, by a top locking surface 102L on the top section 102 and a bottom locking surface 104L on the bottom section 104.

The top and bottom sections provide mechanical stops for the movement of the bail 106 in either direction. The front bottom portion of the bottom section 104 comprises two recessed regions 104*s* (one on each side) within which the sides 106*s* of the bail rotate (FIG. 3). The bottom ridges of the recessed regions 104*s* provide mechanical stops for the bail 106 in its fully un-latched position. Further, the front side portions of the top section 102 are provided with thinned or cut away regions 102*s* within which the sides of the bail fit when it is in or near to its latched position (FIG. 3). The rear ridges of the thinned or cut away regions 102*s* provide mechanical stops for the bail 106 in its fully latched position.

Figure 4:
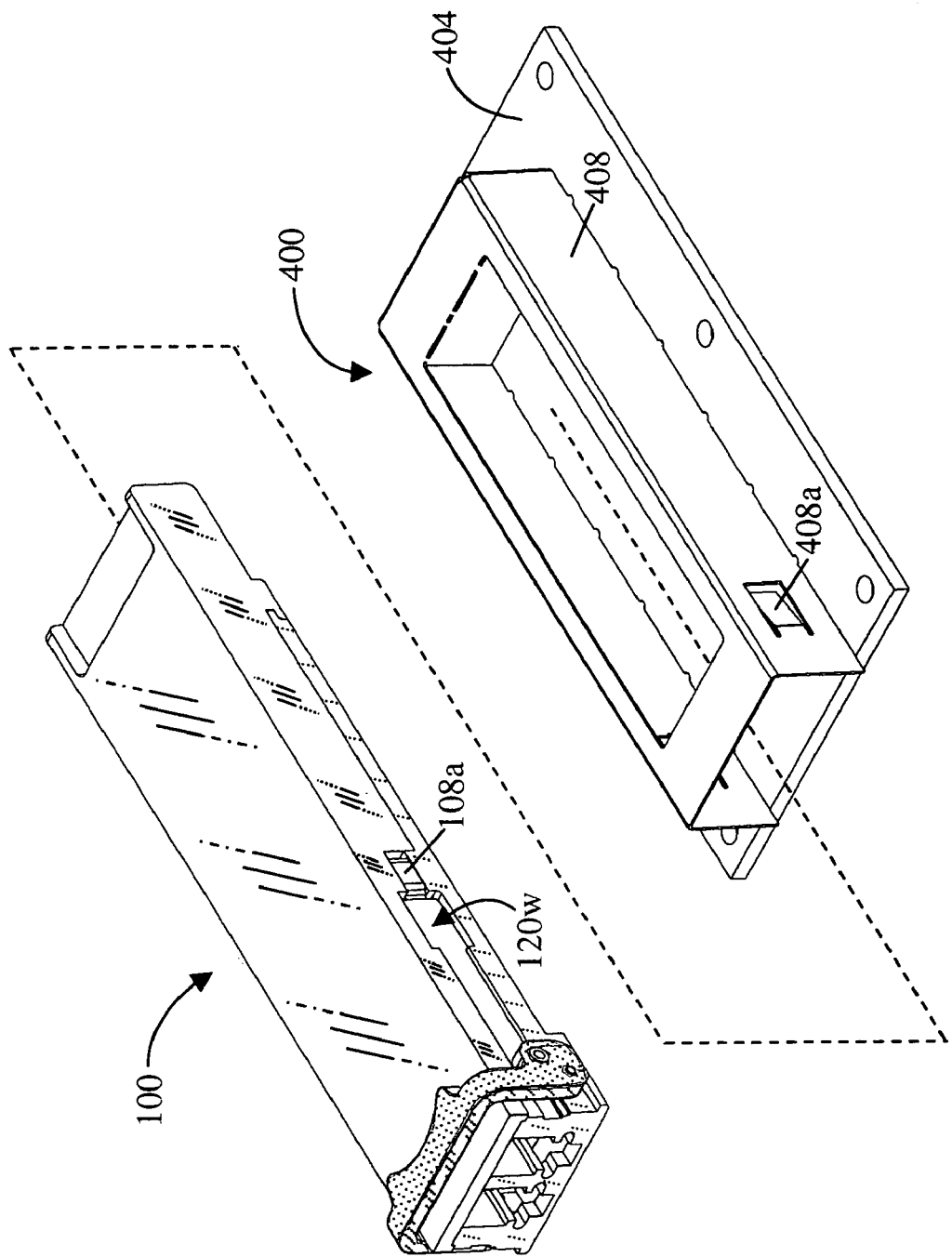
FIG. 4 is an external view of the latchable opto-electronic module of FIG. 1 and its housing.

FIG. 4 is an external view of the latchable opto-electronic module 100 of FIG. 1 showing how it fits into and is latched into a housing or mounting unit 400. The mounting unit 400, whose design conforms to industry standards, such as the MSA standard, and may be a port within a host device, comprises a hollow container or cage 408 secured to a base 404. The cage and base together form a hollow box structure that is dimensioned so as to securely receive the module 100 when the module 100 is slid into the mounting unit from front to back. The cage 408 has two inwardly-protruding tabs 408*a* (one on each side of the cage 408) that are inwardly-bent portions of the side walls of the cage and that, functionally, are catches for arresting the movement of the module 100 when it is in its latched configuration. The tabs 408*a* partially protrude into the interior of the cage 408 in the absence of any solid object to stop them. However, when the tabs 408*a* come into contact with a solid object inward of their positions, then they may elastically bend into an orientation substantially parallel to the side exterior of the cage 408. The spring force of the tabs 408*a* restores them to their inwardly protruding positions when the contacting object is removed. When the opto-electronic module 100 is in its correct latched working position within the mounting unit 400, each tab 408*a* of the cage is adjacent to a respective enlarged-gap region 120*w* of a gap 120 of the module 100 and protrudes into the enlarged-gap region 120*w*.

Figure 5A:
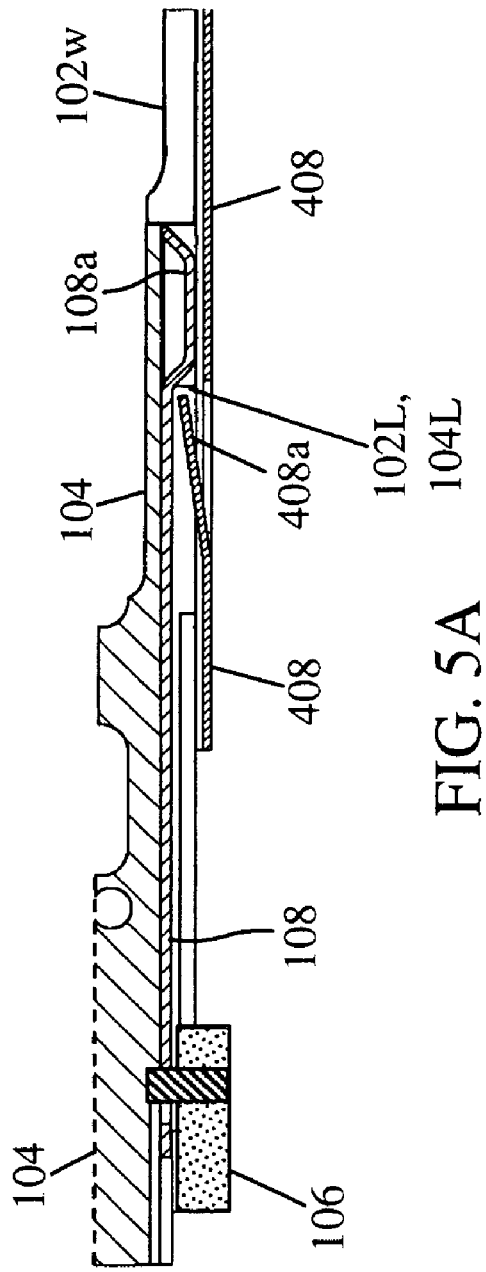
FIG. 5A is a plan section view of the latch portion of the latchable opto-electronic module of FIG. 1, shown in the latched position.
Figure 5B:
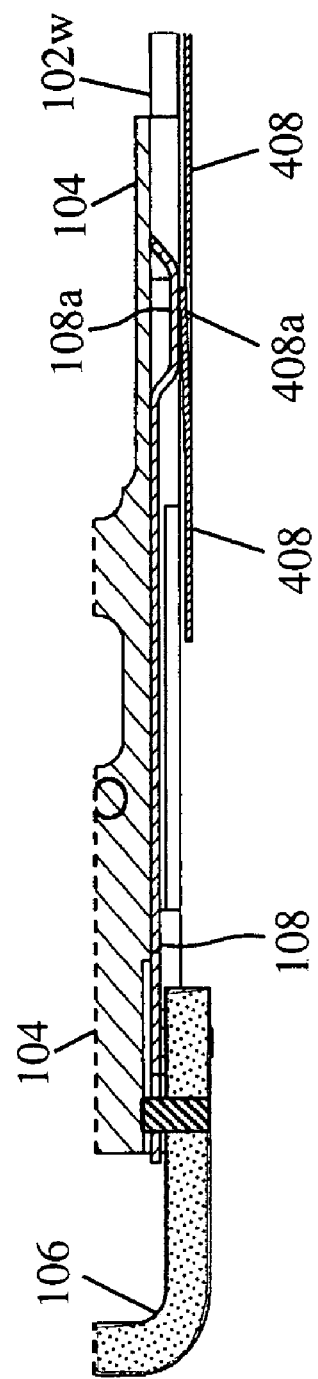
FIG. 5B is a plan section view of the latch portion of the latchable opto-electronic module of FIG. 1, shown in the un-latched position.

FIGS. 5A–5B are plan section views of the latch portion of the latchable opto-electronic module 100 within its mounting unit. FIG. 5*a* illustrates the latched configuration and FIG. 5B illustrates the un-latched configuration. With the module 100 in its proper position within the mounting unit 400, if the latching mechanism is in its latched position—that is, with the bail 106 set as shown in FIG. 2 such that the flared tabs 108*a* of the slider strips 108 are in their fully rearward positions—then the tabs 408*a* protrude into the enlarged-gap regions 120*w* because the flared tabs 108*a*, being to the rear of the tabs 408*a*, do not prevent the tabs 408*a* from protruding into the enlarged-gap regions 120*w*. If a user attempts to extract the module 100 from the mounting unit 400 under such a situation, then the locking surfaces 102L on the top section and the locking surfaces 104L on the bottom section will engage the inwardly protruding tabs 408*a*, thereby preventing the extraction.

Still assuming that the module 100 is in its proper position within the mounting unit 400, if the latching mechanism is in its un-latched position (FIG. 5B), then the flared tabs 108*a* are aligned with the enlarged-gap regions 120*w* and are adjacent to and inward of the tabs 408*a* of the cage 408. Under this situation, the inwardly protruding tabs 408*a* are pushed outward by the flared tabs 108*a* so that the inwardly protruding tabs can no longer engage the locking surfaces 102L and 104L. If, in this un-latched configuration, a user attempts to extract the module 100 from the mounting unit 400, then the flared tabs 108*a* simply slide against the tabs 408*a* and the module 100 may be extracted.

If the module 100 is in its proper position within the mounting unit 400 and the latching mechanism is in the un-latched state, then, if a user lifts and pushes the bail 106 upward and rearward, the slider strips 108 and the outwardly-flared tabs 108*a* will be driven to the rear of the tabs 408, allowing the tabs 408 to protrude into the enlarged recess regions 120*w*, generally with an audible "click". Such an action places the module into its latched state, as described previously.

If the module 100 is in its proper position within the mounting unit 400 and the latching mechanism is in the un-latched state (FIG. 5A) and if the user pulls forward and downward on the bail 106 so as to unlatch the module, then the slider strip will move forward causing the flared tab 108*a* to become disengaged from its stop position against the wall 102*w* (FIG. 5A). As the flared tab 108*a* moves forward with the slider strip 108, the flared tab 108*a* will make contact with the inwardly protruding tab 408*a* of the cage 408. In this situation, the passing of the slanted edge of the tab 108*a* past the tab 408*a* will force the tab 408*a* outward allowing the mechanism to be placed into the configuration shown in FIG. 5B, in which the tabs 408*a* cannot engage the locking surfaces 102L and 104L. The user may then extract the module 100 from the mounting unit as described previously.

A pluggable optical and electronic module having an improved latching mechanism has been disclosed. An optical and electronic module in accordance module in accordance with the present invention may be latched or un-latched via a mechanism that is simpler in construction with respect to known module latching mechanisms. Although the present invention has been described in accordance with the embodiments shown and discussed, one of ordinary skill in the art will readily recognize that there could be variations to the embodiments and those variations would be within the spirit and scope of the present invention. For instance, although the preferred embodiment of the present invention is described in the context of optical transceiver modules used in the field of optical networking, it will be appreciated that the teachings of the present invention are applicable to any type of pluggable optical or electronic module that utilizes a latching system to facilitate insertion and extraction from a host port, cage or housing. Accordingly, many modifications may be made by one of ordinary skill in the art without departing from the spirit and scope of the invention, which is defined by the appended claims.

What is claimed is:

1. An optical and electronic module capable of being secured within and released from a container, comprising:
    a top portion having a top side wall;
    a bottom portion coupled to the top portion and having a bottom side wall, the top side wall and bottom side wall being shaped so as to form a gap between the top portion and the bottom portion along a side of the module;
    a bail coupled to the bottom portion;
    a strip coupled to the bail, the strip having an outwardly flared tab, the outwardly flared tab movable within the gap, wherein a position of the outwardly flared tab with respect to a catch of the container determines whether the module is secured within the container; and
    at least one front port for insertion of an optical element, wherein the optical element while inserted prevents rotation of the bail from a latched position to an unlatched position and the optical element is only insertable into the at least one front port in the latched position due to interference of the bail in the unlatched position with the at least one front port.

2. The optical and electronic module of claim 1, wherein the bail is coupled to the lower portion by at least one pin passing through the bail and the lower portion, the bail restricted to rotation about the at least one pin.

3. The optical and electronic module of claim 1, wherein the bail is coupled to the strip by a pin passing through the bail and the strip.

4. The optical and electronic module of claim 1, wherein, in a latched configuration, the catch protrudes into the gap.

5. The optical and electronic module of claim 1, wherein, in an un-latched configuration, the outwardly flared tab prevents the catch from protruding into the gap.

6. The optical and electronic module of claim 1, further comprising:
    a second top side wall of the top portion;
    a second bottom side wall of the bottom portion, the top side wall and bottom side wall being shaped so as to form a second gap between the top portion and the bottom portion along a second side of the module;
    a second strip coupled to the bail, the second strip having a second outwardly flared tab, the second outwardly flared tab moving within the second gap, the position of the second outwardly flared tab with respect to a second catch of the container determining whether the module is secured within the container.

7. The optical and electronic module of claim 1, further comprising:
    a protruding hook section of the top portion; and
    a cut-away section of the bottom portion, wherein the hook section is capable of mechanically engaging the cut-away section so as to fasten the top portion to the bottom portion.

8. The optical and electronic module of claim 1, wherein the strip is constrained to movement parallel to the top side wall and bottom side wall.

9. The optical and electronic module of claim 8, the bottom side wall having a recessed region, the strip constrained to sliding movement parallel to the recessed region.

10. The optical and electronic module of claim 9, further comprising a groove formed in the bottom side wall, the strip constrained to sliding movement within the groove.

11. A method of releasing an optical and electronic module from a latched position within a container, the optical and electronic module having a side with a gap, the container having a catch protruding into the gap in the latched position, comprising the steps of:
    (1) causing an outwardly flared tab to slide against the catch so as to prevent the catch from protruding into the gap, wherein inserting an optical element into a port of the module is prevented at anytime when the outwardly flared tab is preventing the catch from protruding into the gap; and
    (2) removing the module from the container.

12. The method of claim 11, wherein the causing step (1) comprises rotating a bail coupled to the module and coupled to a strip having the outwardly flared tab, the strip sliding parallel to the side.

13. The method of claim 12, wherein the strip is constrained to sliding movement within a groove along the side.

14. An optical and electronic module capable of being secured within and released from a container, comprising:
    a top portion having a protruding hook section disposed at a first end of a length of the top portion, wherein a slot opening toward a second end of the top portion extends through a side wall of the top portion to define the hook section;
    a bottom portion coupled to the top portion and having a cut-away section, wherein the hook section is slidable in a direction parallel to the slot for mechanically engaging the cut-away section so as to fasten the top portion to the bottom portion at the first end; and
    a screw threaded into the bottom portion and disposed in a clearance aperture within the top portion at the second end thereof to fasten the top and bottom portions together at the second end, wherein the screw prevents relative sliding between the top and bottom portions to maintain mating of the hook and cut-away sections.

15. An optical and electronic module capable of being secured within and released from a container, comprising:
    a housing defining a recess along a side of the module;
    a bail coupled to the housing, the bail rotatable from a locked position substantially transverse to the module and an unlocked position with a top of the bail in substantial alignment with a front port of the module, wherein mechanical stops prevent movement of the bail past a range defined between the locked and unlocked position; and
    a strip coupled to the bail for movement therewith, wherein the strip includes an outwardly flared tab that is movable within the recess by rotation of the bail to selectively release a catch of the container from the recess.

* * * * *